United States Patent [19]
Ridenour et al.

[11] 3,955,760
[45] May 11, 1976

[54] THERMOSTATIC AIR VALVE

[75] Inventors: Michael R. Ridenour, Fremont, Ind.; Jerry L. Zabonick, Hillsdale, Mich.

[73] Assignee: Evans Products Company, Portland, Oreg.

[22] Filed: May 5, 1975

[21] Appl. No.: 574,317

[52] U.S. Cl. .................... 236/86; 251/25; 137/625.6
[51] Int. Cl.² .................. G05D 23/02; F16K 31/126
[58] Field of Search ............. 251/25; 137/625.6; 236/86

[56] References Cited
UNITED STATES PATENTS

| | | | |
|---|---|---|---|
| 2,265,496 | 12/1941 | Shaw | 251/25 X |
| 3,848,622 | 11/1974 | Cummings | 236/86 X |

*Primary Examiner*—Arnold Rosenthal
*Attorney, Agent, or Firm*—Robert E. Howard

[57] ABSTRACT

A thermostatically operated air valve having a valve body, a valve chamber located within the body, a thermal sensor having a push rod extending therefrom into said valve chamber at a first end thereof, a reciprocal valve rod located in the valve chamber with an axial opening therein communicating with a supply of air under pressure, said axial opening of the valve rod communicating with a cylinder located at the second end of said valve chamber, a piston located within said cylinder and slidably mounted on the valve rod for rapid reciprocal movement thereon, an exhaust port in said cylinder having a retractable valving member seated in sealing relationship within said exhaust port, said push rod being in abutting relationship with said valve rod, said push rod extending at a predetermined actuation temperature to push said valve rod into contact with said valving member thereby sealing said axial opening in the valve rod and unseating said valving member from said exhaust port, whereby air in said cylinder is exhausted to the atmosphere and said piston is rapidly forced outwardly toward the second end of said valve chamber whereby communication between said air supply and an exit passageway is established. The exit passageway communicates with an air actuatable device, such as an air driven fan clutch.

3 Claims, 2 Drawing Figures

THERMOSTATIC AIR VALVE

BACKGROUND OF THE INVENTION

Thermostatically operated air valves have been designed for a variety of uses such as actuation of shutters for the radiators of automobiles and trucks.

Such thermostatically operated air valves are actuated at a predetermined temperature, corresponding to that temperature at which commencement of cooling is desired. At temperatures below the actuation temperature, air does not flow from the air supply to the air actuated device.

Generally, such thermostatically operated air valves employ commercially available devices or sensors having a material therein which, upon reaching the desired actuation temperature, expands and pushes outwardly a push rod or pin, which in turn pushes against a valve member which opens and closes air passageways to either communicate or cut-off the air from the air supply to the air actuatable device. Typical of such temperature actuated air valves are those described in U.S. Pat. Nos. 3,006,552, 3,135,495, and 3,313,485.

While satisfactory for some uses, one shortcoming of such devices is that the thermal sensor extends its push rod only a short distance thereby limiting the size of the opening communicating the air supply with the air actuatable device. This shortcoming causes the air to reach the air actuatable device in diminished flow, whereas for many applications it is highly desirable that the air flow be large and immediate.

Therefore, an object of the present invention is to provide a thermostatically operated air valve which provides almost instantaneous communication between the air supply and the air actuatable device through sufficiently large openings that actuation of the air actuatable device is effected rapidly.

SUMMARY OF THE INVENTION

Basically, the present invention is an air valve having a poppit-type piston which rapidly moves at the actuation temperature of the thermal sensor from a first position cutting off communication between the air supply and the air actuatable device to a second position establishing communication therebetween, and rapidly returns to its first position when the temperature drops below the actuation temperature of the thermal sensor. This action is effected by providing an apparatus comprising a valve body having a valve chamber located therein, an air delivery opening in the valve body for communicating a source of compressed air with the valve chamber, a thermal sensor having a push rod extending therefrom into said valve chamber at a first end thereof, a reciprocal valve rod located in the valve chamber, said valve rod having an axial passageway therein communicating with a cylinder located at the second end of said valve chamber and communicating with the source of compressed air at another location, said push rod abutting said reciprocal valve rod, a piston slidably mounted on said reciprocal valve rod, a retractable valving member seated in an exhaust port communicating said cylinder with the atmosphere, said reciprocal rod being located relative to said retractable valving body such that upon extension of the push rod of said thermal sensor at the actuation temperature, said valve rod contacts said valving body at a location which seals the axial passageway of said valve rod and unseats the valving body, thereby permitting air under pressure within said cylinder to excape through said exhaust port to the atmosphere, whereby when said air escapes from said cylinder, said piston is rapidly forced outwardly along the valve rod from a first position which seals an air exit passageway from communication with the air supply to a second position where said air exit passageway is in communication with the air supply.

DESCRIPTION OF PREFERRED EMBODIMENT

Figures 1, 2:
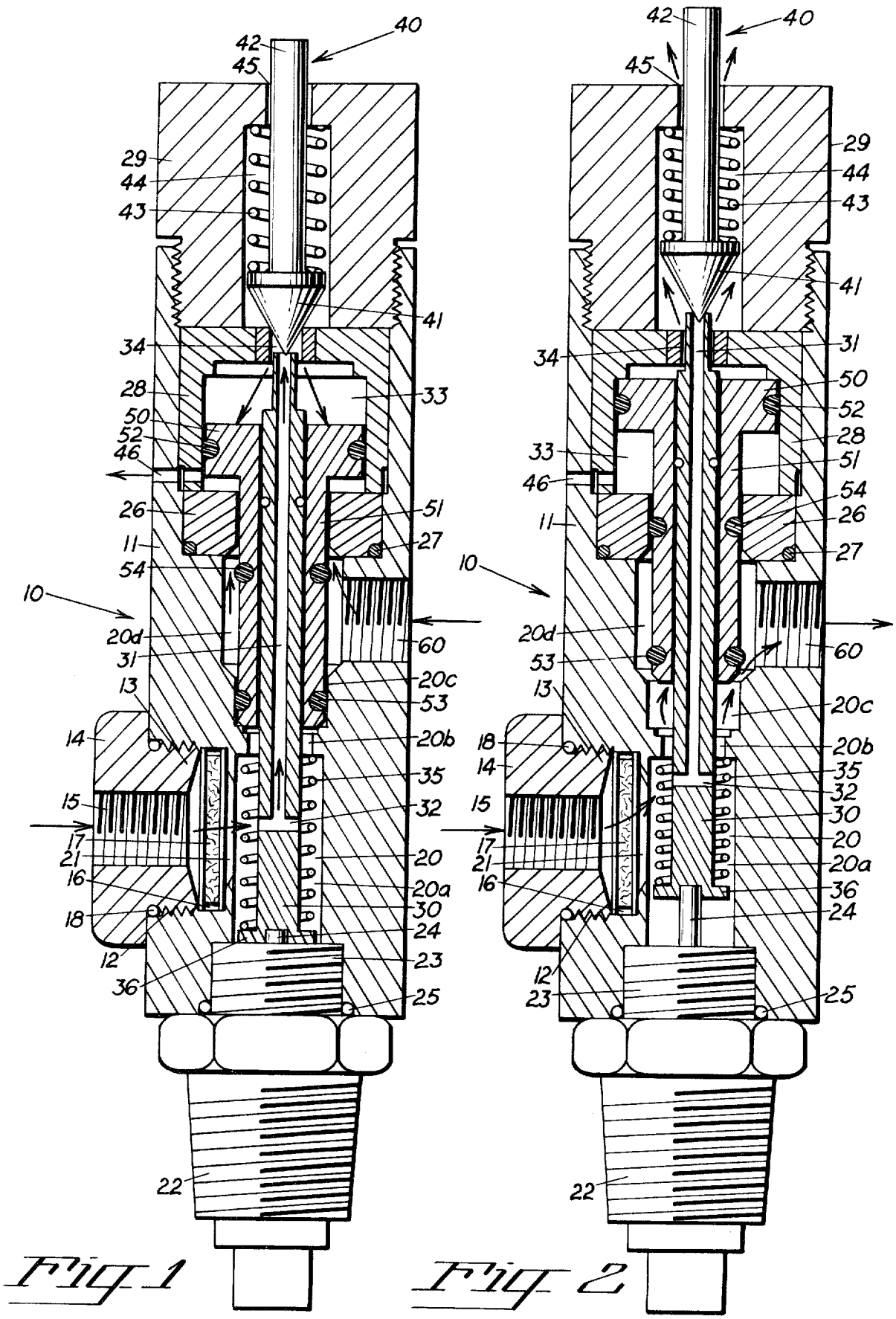

Reference is made to the drawing for an understanding of the preferred embodiment of the present invention.

In the drawing, FIG. 1 is a cross-secttion of the thermostatically operated air valve of the present invention with the components thereof shown in the position they occupy at a temperature below the actuation temperature of the thermal sensor; and FIG. 2 is a similar cross-sectional view of the air valve showing the components in the position they occupy at or above the activation temperature of the thermal sensor.

Referring now to FIG. 1, the air valve 10 of the present invention is illustrated in cross-section. The valve 10 comprises a generally cylindrical body 11. Located along the periphery of body 11 is an internally threaded recess 12 for receiving the externally threaded neck portion 13 of an air supply connection member 14. Air supply connection member 14 has an internally threaded air supply passageway 15 which communicates with a suitable supply of air under pressure (not shown). Located interiorly of internally threaded recess 12 is recess 16 which contains a disk-shaped filter member 17. An O-ring 18 provides an air tight seal between connection member 14 and body 11.

Body 11 contains a valve chamber 20 which communicates with air supply passageway 15 via opening 21. Valve chamber 20 has a varying diameter, the different portions of which are designated as 20a, 20b, 20c and 20d in the drawing. The first end of valve chamber 20 is portion 20a and the second end is portion 20d.

A thermally responsive sensor element 22 is threadably connected to a first end of body 11 by means of a threaded neck portion 23. A push pin 24 extends from thermally responsive sensor element 22 into the first end of valve chamber 20, as shown. O-ring 25 provides an air tight seal between sensor 22 and valve chamber 20.

Ring member 26, with associated O-ring 27, and cylinder 28 are press fitted into valve body 11 at the second end thereof. Cap member 29 is threadably connected to the second end of body 11 at a location adjacent cylinder 28.

Extending within valve chamber 20 is a reciprocal valve rod 30 having an axial opening or bore 31 located therein. A peripherally located inlet port 32 located near a first end of valve rod 30 communicates axial bore 31 with portion 20a of valve chamber 20. Axial bore 31 at its outlet end communicates with the chamber 33 of cylinder 27, as shown. Valve rod 30 extends through the bore of ring 22, through chamber 33 of cylinder 27 and slightly into exhaust port 34. Exhaust port 34 communicates chamber 33 with the atmosphere in a manner which will be described in more detail below. Valve rod 30 is normally urged against thermal sensor 22 and push pin 24 by the action of a coil spring 35 acting against flange 36 of valve rod 30.

Seated in sealing relationship in exhaust port 34 is retractable valving member 40 which, in the preferred embodiment, has a conical head portion 41 and a stem portion 42. The apex of conical head portion 41 is of such a size that it will be inserted into the outlet of axial bore 31 upon contact therewith, as shown in FIG. 2. Coil spring 43 urges the conical head portion 41 into sealing relationship with exhaust port 34, as shown. Retractable valving member 40 is carried within a chamber 44 of cap 29, and the stem portion 42 thereof extends through an exhaust port 45 to the atmosphere outside of cap 28. Exhaust port 45 has a slightly larger diameter than stem 41 to permit air flow therearound, as will be described.

Piston 50 is slidably mounted on the exterior of valve rod 30, as shown, and is coaxial therewith. Piston 50 has a narrowed stem portion 51 extending toward the first end of valve chamber 20 and provides a valving action as will be explained below.

Piston 50 carries an O-ring 52 which provides a sealing engagement with the interior wall of cylinder 28. O-ring 53 provides a sealing engagement with the interior wall of portion 20c of central passageway 20 in the position of the components illustrated in FIG. 1, which is their position below the activation temperature of the thermal sensor 22. O-ring 54 provides sealing engagement with the bore wall of ring member 26 when the components are in the position illustrated in FIG. 2, which is the position when the thermal sensor 22 is exposed to the actuation temperature or above.

Exit passageway 60 provides communication between the air supply source and the device that is air actuatable when the components are in the position illustrated in FIG. 2, the air flow being that shown by the arrows.

The operation of the device of the present invention will now be explained. The valve 10 is installed with thermal sensor 22 in a location to be exposed to the cooling fluid or an internal combustion engine or any other location where it is desired to have temperature responsive air valving action. Air supply connection member 14 is connected to a suitable source of air under pressure, such as a compressor (not shown). While the engine is running at a temperature below the actuation temperature of thermal sensor 22, push pin 24 is in the position shown in FIG. 1. Push pin 24 is in abutting relationship with valve rod 30 which is urged against push pin 24 by coil spring 35 acting against flange 36 of valve rod 30.

Air enters the valve member, as shown by the arrows in FIG. 1, through air supply passageway 15, filter 17, opening 21 and into valve chamber 20 of valve body 11. The air flows from valve chamber 20 into inlet port 32 of reciprocal valve rod 30, and from there into the axial bore 31 thereof. The air in axial bore 31 exits from the second end of valve rod 30, and since exhaust port 34 is sealed by the action of the conical head 41 of valving member 40 seated therein, the air flows into chamber 33 of cylinder 28. The air, under pressure in chamber 33, pushes against piston 50 and urges it into its first position shown in FIG. 1, blocking communication between the air supply and exit passageway 60 by virtue of stem portion 51 thereof abutting against shoulder portion 20b, O-ring 53 forming a sealing engagement with the wall 20c of valve chamber 20.

Upon the cooling fluid reaching or exceeding the actuation temperature of thermally responsive element 22, push pin 24 is extended therefrom, pushing against the first end of reciprocal valve rod 30. Reciprocal valve rod 30 is thus urged outwardly against the action of coil spring 35 and into engagement with the conical head portion 41 of valving member 40. As shown in FIG. 2, at the extreme extension of push pin 24, axial bore 31 of valve rod 30 is completely sealed by the apex of conical head portion 41 of valving member 40 so that no air flows therethrough. In addition, valving member 40 is urged outwardly against the action of coil spring 43, thus unseating conical head portion 41 from its sealing relationship with exhaust port 34, thereby permitting the air under pressure in chamber 33 of cylinder 28 to exhaust therethrough into chamber 44 of cap 29, and from there through exhaust port 45 to the atmosphere.

At the same time, the air flowing into central passageway 20 can no loner flow through inlet port 32 or axial bore 31 of reciprocal valve rod 30, but instead passes through portion 20b of valve chamber 20 and into contact with the stem portion 51 of piston 50, thereby urging it outwardly toward the second end of valve chamber 20, to its second position shown in FIG. 2. Since piston 50 is freely slidable upon valve rod 30, the action occurs almost immediately upon blockage of axial bore 31 and the unseating of valving member 40 from exhaust port 34. As shown in FIG. 2, when piston 50 is moved to its second position, air in chamber 20 is free to pass from portion 20a thereof through portions 20b, c and d of valve chamber 20, and finally through exit passageway 60 to the air actuatable device (not illustrated). O-ring 54, in the position of piston 50 shown in FIG. 2, is now in sealing engagement with the wall of the bore of ring 26 which prevents air from traveling into chamber 33 of cylinder 28 at the backside of piston 50.

Once the engine has cooled down to a temperature below the actuation temperature of thermally responsive element 22, push pin 24 is no longer urged outwardly by the action of element 22, and, therefore, the action of coil spring 35 acting upon flange 36 of valve rod 30 urges the valve rod 30 and push pin 24 back to their retracted positions illustrated in FIG. 1. When this occurs, conical head portion 41 of valving member 40 is once again seated in exhaust port 34 by the action of coil spring 43, sealing chamber 33 from the atmosphere, and also opening axial passageway 31 so that air can flow therethrough into cylinder chamber 33 and against the outside face of piston 50. Since the surface area of the outside face of piston 50 is greater than that of its stem portion 51, the piston is pushed almost instantaneously back to its retracted position as shown in FIG. 1. Once this occurs, the air under pressure in the air actuatable device is then free to escape to the atmosphere by entering exit passageway 60, as shown by the arrow in FIG. 1, and, following the path shown by the arrows in FIG. 1, enters portion 20d of valve chamber 20, passes through the inner bore of ring 26 into the portion of cylinder chamber 33 located behind piston 50, and from there it is exhausted to the atmosphere via exhaust port 46.

There has thus been disclosed a thermally responsive air valve which, upon a small motion of the push pin of a thermally activated sensor, can cause a large, rapid motion of a piston member thereby providing rapid communication between an air supply and an air actuatable device and permits large volume air flow thereto.

We claim:

1. A thermostatically operated air valve for communicating a source of compressed air with an air actuatable device at a pre-determined temperature comprising:
 a. a valve body having a valve chamber having first and second ends;
 b. a thermal sensor element having a push pin extending into the first end of said valve chamber;
 c. the second end of said valve chamber opening into the chamber of a cylinder;
 d. an air delivery passageway in said valve body for communicating a source of compressed air with said valve chamber and an air exit passageway for communicating said valve chamber with the air actuatable device;
 e. a reciprocal valve rod located in said valve chamber, one end thereof being in abutting relationship with said push pin and the other end thereof extending through the chamber of said cylinder, said valve rod having an axial bore therein communicating the chamber of said cylinder with said valve chamber and the source of compressed air;
 f. a piston located within the chamber of said cylinder and slidably mounted on said reciprocal valve rod so that it is slidable therealong from a first position blocking communication between said valve chamber and said exit passageway to a second position opening communication between said valve chamber and said exit passageway;
 g. an exhaust port in said cylinder communicating the chamber of and cylinder with the atmosphere; and
 h. a retractable valving member seated in said exhaust port, said reciprocal valve rod being located relative to said retractable valving member such that upon extension of said push pin at the actuation temperature of said thermal sensor said valve rod contacts said retractable valving member at a location which seals the axial bore thereof and unseats said retractable valving member, thereby permitting air under pressure within said cylinder to escape through said exhaust port to the atmosphere and causing air entering said valve chamber to push outwardly against said piston thereby causing it to move from said first position to said second position opening communication between said exit passageway and said valve chamber.

2. The air valve of claim 1 wherein said exit passageway is peripherally located in said valve body and said piston has a stem portion coaxial with said valve rod extending toward the first end of said valve chamber a distance sufficient to block communication between said valve chamber and said exit passageway while said piston is in its first position.

3. The air valve of claim 1 wherein said valving member has a conical head portion which seats in and seals said exhaust port, and is of such a size that it will insert into and seal the outlet of the axial bore of the valve rod upon contact therewith.

* * * * *